United States Patent Office 3,535,107
Patented Oct. 20, 1970

3,535,107
ALANE PRODUCTION AND UTILIZATION
Gunner E. Nelson, Warren E. Becker, and Paul Kobetz, Baton Rouge, La., assignors to Ethyl Corporation, New York, N.Y., a corporation of Virginia
No Drawing. Filed Oct. 23, 1967, Ser. No. 677,088
Int. Cl. C22b 21/02
U.S. Cl. 75—68          15 Claims

ABSTRACT OF THE DISCLOSURE

A process for preparing tertiary amine alanes by direct synthesis from hydrogen, an aluminum source, and a tertiary mono amine in the presence of a reaction promoter and effecting the recovery of purified aluminum by thermally decomposing the tertiary amine alanes at a relatively low temperature to form essentially pure aluminum.

---

This invention relates to the synthesis of tertiary amine alanes directly from aluminum, hydrogen and tertiary mono amines and to the utilization of this process in the chemical refining of metallic aluminum. In addition to their use as intermediates in the refining of aluminum, tertiary amine alanes also find use in plating aluminum and as reducing agents.

Heretofore various methods have been described for the synthesis of tertiary amine alanes, that is, complexes between tertiary amines and aluminum hydride. For example, Wiberg, Graf and Uson, Zeitschrift fur Anorganische und Allgemeine Chemie, 272, 221–232 (1953), disclose the direct reaction between trialkyl amines and aluminum hydride in ether solutions. However, in order to practice the Wiberg et al. procedure, it is necessary to utilize complicated or expensive procedures for the synthesis of the aluminum hydride. More particularly, as noted by Ziegler and Gellert (U.S. 3,032,574) aluminum hydride cannot be produced by a simple addition reaction between aluminum and hydrogen. Thus, Wiberg et al. synthesized the aluminum hydride in ether solution by reaction between lithium aluminum hydride and aluminum chloride. Another way of preparing aluminum hydride in ether solution involves reaction between the correct proportions of an alkali metal hydride or an alkaline earth metal hydride and aluminum chloride. See Bragdon U.S. 2,680,059.

Another method for preparing tertiary amine alanes is that reported by Ruff and Hawthorne, J. Am. Chem. Soc., 82, 2141 (1960) which involves reacting lithium aluminum hydride with trimethyl amine hydrochloride in ether.

More recently, Brendel, Kobetz and Whaley (U.S. 3,326,955) describe a process for the preparation of tertiary amine alanes which involves effecting reaction under appropriate conditions among alkali metal hydride, an aluminum trihalide, and a trialkyl amine, a catalytic amount of an alkyl aluminum compound being utilized.

It will be noted that none of the foregoing methods is capable of preparing tertiary amine alanes directly from aluminum, hydrogen, and tertiary mono amines. So far as is known, the only successful synthesis of tertiary amine alanes directly from the elements (so to speak) is that reported by Ashby (U.S. 3,159,626; copending application S.N. 334,900 filed Dec. 31, 1963; and J. Am. Chem. Soc. 86, 1882–3 (1964). In the Ashby processes, triethylene diamine or tetramethylethylene diamine, both of which are tertiary diamines, are reacted with aluminum and hydrogen under appropriate reaction conditions to form tertiary amine alane products. When triethylene diamine is employed, the product which is formed $$[N(C_2H_4)_3N \cdot AlH_3]$$

is a solid which is insoluble in hydrocarbons, ethers and other common organic media. Moreover, this product is thermally stable up to temperatures of over 200° C. and thus to liberate aluminum from this compound by thermal decomposition requires relatively high temperatures. When tetramethylethylene diamine is used in the Ashby procedure, the reaction tends to be quite slow and yields various complexes in which the content of active hydrogen corresponds to a H:Al ratio of about 1.2:1 or less.

Unfortunately, attempts to apply the Ashby discoveries to tertiary mono amines rather than tertiary diamines have heretofore been unsuccessful, as witness the fact that trialkylamines can be used as inert solvents for the reaction among aluminum, hydrogen and triethylene diamine (note U.S. 3,159,626, col. 2, lines 3–9). In fact, the reaction among tertiary amines, aluminum, and hydrogen does not proceed with any perceptible rate even when utilizing activated aluminum.

It has now been discovered that this latter reaction can be readily conducted under relatively mild conditions provided certain reaction-promoting catalysts are utilized.

Accordingly, an object of this invention is to provide a process for the synthesis of tertiary amine alanes directly from aluminum, hydrogen and tertiary mono amines. A further object is to provide a process for the production of metallic aluminum which, inter alia, utilizes the herein-desrcibed process for the synthesis of tertiary amine alanes. Other objects, features, advantages, and characteristics of this invention will become still further apparent from the ensuing description and appended claims.

The foregoing objects and other advantages hereinafter emphasized are realized in two embodiments of the invention. The first embodiment is characterized by the preparation of tertiary amine alanes by a catalyzed reaction between metallic aluminum, hydrogen and a tertiary mono amine. The second embodiment relates to the utilization of this reaction in a process for producing pure aluminum.

In accordance with the first embodiment of the invention tertiary amine alanes are prepared in an anhydrous system by reacting together metallic aluminum, hydrogen and a tertiary mono amine in the presence of at least one reaction-promoting element selected from Group IV–B or Group V–B as set forth in the periodic chart of the elements published by Fisher Scientific Company. Thus, titanium, vanadium, zirconium, hafnium, niobium, and tantalum may be used either individually or in combination as catalysts, and of these, titanium and vanadium are preferred, titanium being the most preferred reaction promotor in the alane synthesis. Since it has been found that this process requires the presence of a reaction promoter to synthesize the alanes, in a preferred feature of the first embodiment of the invention titanium is introduced into the system in the form of a titanium-containing aluminum alloy. (The term "metallic" as applied to aluminum in this specification and in the claims is intended to denote the metal per se or alloyed with other metals, as distinguished from intermetallic aluminum.) Since titanium is frequently found to naturally occur in various aluminum alloys, it is significant that utilization of such an alloy as the source of metallic aluminum eliminates the need for further addition of titanium or other catalyst to the system. It is also significant that the aluminum alloy may contain impurities ordinarily found in aluminum source materials in addition to titanium without retarding the effectiveness of the titanium in promoting the alane synthesis reaction. For example, an alloy containing titanium and appreciable quantities of iron and silicon has been used successfully in practicing the invention. Typically, the alloy may be present in the system in the form of a carbothermic aluminum alloy having approximately the following composition by weight:

Aluminum—60%
Silicon—35%
Iron—3%
Titanium—2%

While these composition percentages are not critical, the aluminum content should preferably be at least 40 percent, and substantially any alloy, or metallic scrap aluminum source, having at least this aluminum content will provide a suitable starting material for the invention regardless of the presence of impurities such as, or in addition to, those noted above. In a typical aluminum alloy source the silicon content may range from about 5 to about 50 percent and the iron from about 0.1 to about 10 percent by weight of the alloy. It is preferable to realize a low alloy iron content to avoid the formation of an iron-aluminum intermetallic which does not react in the hydroalumination phase of the process. In order to practice applicants' invention with best advantage it has been found that the aluminum should be introduced into the reaction system in subdivided form to facilitate maximum surface area for interaction of the reactants. Size reduction may easily be accomplished by such processes as flaking, granulating, milling, or by any other conventional method known to those skilled in the art. While the actual particle size of the aluminum reactant is not critical, in a preferred feature of the invention the aluminum is subdivided and capable of passing through a 325 mesh screen.

The amine synthesis embodiment of the invention is further characterized by a feature of catalyst utilization which provides that the reaction promoter may be introduced into the system by means of a suitable catalyst-containing compound. Typically, titanium has been effectively added to the reaction system as a titanium ester and vanadium has been used successfully as a reaction promoter when introduced as a vanadium salt.

In addition to the discovery that a catalyst is necessary in the amine synthesis process, it has further been determined that the metallic aluminum should be activated in order for the reaction to proceed most expeditiously. Such activation may be accomplished by application of a variety of techniques, one of which is the addition of certain activating components which will be hereinafter further identified. Thus, the use of activated aluminum, especially in subdivided form, is a preferred embodiment of this invention.

In addition to the advantageous features characterized by application of a "built in" catalyst system in the form of a reaction promoter-containing aluminum alloy or readily available catalyst-containing compounds, or both, the amine alane synthesis embodiment of the invention is further advantageous in that it is capable of being practiced under mild reaction conditions. For example, the reaction may easily be carried out at a temperature ranging from about 50 to about 200° C., and as illustrated in the examples, reaction at this relatively low temperature gives excellent results. A preferable synthesis temperature for the amine alane is from about 60° C. to about 100° C. and a most preferable temperature range for carrying out this reaction is from about 70° C. to about 90° C. System pressure is subject to wide variation and may range from 50 to 15,000 p.s.i.g. or higher, although according to a preferred feature of the invention the hydrogen pressure range found to be more preferable was from about 500 to about 5000 p.s.i.g.; the pressure should be most preferably adjusted to a range of from about 500 to about 3000 p.s.i. during the reaction period. Practice of the invention utilizing temperatures and pressures falling within the above ranges resulted in the formation of tertiary amine alane in good yield.

As heretofore noted, in a preferred feature of the alane synthesis, reaction-promoting titanium is introduced into the system as a constituent of the metallic aluminum itself or it may exist simply as an impurity associated with the aluminum source material. Tests have shown that when the alloy is used as the titanium source in the invention the titanium content of this alloy may effectively exist in quantities ranging from about 0.001 to about 10 percent and should preferably be present in quantities within the range from about 0.01 to about 5 percent by weight of the alloy, although the upper limit of the titanium content appears not to be critical. The titanium content should most preferably be from about 0.02 to about 2 percent of the weight of the aluminum alloy.

As additionally heretofore noted, the reaction promoter may be introduced into the system independently of the aluminum source material by use of a catalyst-containing compound such as an ester or a halide salt of a Group IV-B or V-B metal as set forth in the Fisher Periodic chart. Thus, effective use may be made of titanium-containing compounds such as titanium esters having from 1 to about 12 carbon atoms, titanium halides and vanadium halides, as well as esters and halide salts of other Group IV-B and V-B metals. Typical of the metal esters which may be used with good results in the alane synthesis are titanium methoxide, hafnium butoxide, zirconium isopentoxide, niobium decoxide and tantalum dodecoxide. Preferred metal halides are titanium trichloride, titanium tetrabromide, titanium diiodide, vanadium trichloride, zirconium tetrachloride and tantalum tribromide. Most preferred catalysts in the alane synthesis stage of the invention are titanium isopropoxide, vanadium tetrachloride and titanium tetrachloride.

When utilizing these catalyst-containing compounds, the aluminum subjected to the reaction may range from impure or scrap aluminum alloys, and the like up to pure aluminum itself, such as primary aluminum.

Although the enumerated reaction promoters represent preferred catalysts for use in the invention, it will be apparent to those skilled in the art that substantially any compound or compounds containing at least one of the metals found in Group IV-B and V-B may be used to successfully promote the alane synthesis reaction. It should be noted that the reaction promoters may be effectively utilized alone or in combination, and the catalyst-containing compound may be used in the process whether the metallic aluminum source contains a reaction promoter or not. The concentration of the selected compound added to the system does not appear to be critical since trace amounts have been found sufficient to promote the reaction even where no catalyst is present in the aluminum reactant.

A further preferred feature of the first embodiment involves reacting the metallic aluminum and tertiary mono amine with hydrogen in an anhydrous system where a relatively inert solvent is added to dissolve the amine and the amine alane product. Anhydrous conditions are preferred to insure that the alane will not decompose and release active hydrogen bound therein. Suitable solvents for effective use in the invention are aromatic hydrocarbons (substituted and unsubstituted), cyclic and polycyclic ethers, and amines (preferably tertiary mono amines). Preferable solvents are benzene, toluene, diphenyl ether, tributylamine and trimethylamine. Most preferred solvents for use in the process are benzene and trimethylamine. The above enumerated solvents are intended to be illustrative and not limiting in the invention since it has been found that substantially any solvent which is relatively inert can be used with satisfactory results.

While synthesizing amine alanes according to the first embodiment of the invention it has been determined that the amine reactant utilized in the process should be a tertiary mono amine. Thus, effective use may be made of tertiary mono amines where the groups attached to the nitrogen atom are alkyl, aryl, aralkyl, heterocyclic and the like. Usually such trihydrocarbon amines or heterocyclic mono amines will contain a total of up to about 30 carbon atoms in the molecule. The tertiary mono amine so characterized may be typically tributylamine, methylethyl-i-propylamine, benzyldiethylamine, dibenzylpropylamine, tricyclohexylamine, tribenzylamine, tris-(4-pyridyl) amine, and ethyl bis-(4-pyridyl) amine, but is preferably a trialkylamine, and most preferably a trialkylamine having from 1–4 carbon atoms in each alkyl group. In a preferred feature of the invention trimethylamine is reacted in a benzene solvent, and in a most preferred feature of the amine synthesis phase of the process trimethylamine is used as the tertiary mono amine in the reaction and an excess of this amine as the reaction solvent. As previously noted, where the reaction is carried out in the above mentioned and other relatively inert solvents, the tertiary mono amine as well as the amine alane product should be soluble in the solvent medium in order to facilitate separation of the amine alane from solids in the reaction system according to a hereinafter described feature of the second embodiment of the invention. However, if desired, the process may be carried out in the absence of a solvent. Where no solvent is used in the reaction the solids may be removed by sublimation or by selectively extracting the amine alane product from the solids by any conventional leaching operation, the techniques of which are well known to those skilled in the art.

As heretofore noted, the aluminum in the system should be activated in order for the reaction to take place most expeditiously. Accordingly, another preferred feature of the amine synthesis embodiment is the reaction of metallic aluminum, a tertiary mono amine, and hydrogen in an anhydrous system containing an inert solvent and in the presence of an aluminum activator. Among the satisfactory activators and promoters which may be used to activate the metallic aluminum are aluminum hydrocarbon compounds, notably of alkyl aluminum composition, the most preferred of which is triethylaluminum. It has been found that presence of this compound in trace amounts will satisfactorily promote the reaction; however, the triethylaluminum should preferably be present in quantities up to about 5 percent based on the weight of the reactants in the amine synthesis stage of the process. Further, in addition to or in the place of aluminum hydrocarbon compounds, such materials as alkali metals, alkali metal hydrides and dialkylaluminum alkoxides, notably diethylaluminum ethoxide, may be used as aluminum activating agents in the invention. The most preferable component of this latter group is sodium metal or sodium hydride, and in a most preferred combination, sodium metal is used with triethylaluminum as the aluminum activating system. It has been found that the activators may be used individually or in combination, whether the reaction promoter or promoters are introduced into the system as a constituent of the aluminum alloy or by means of a catalyst-containing compound, and whether a solvent is used or not. It should be noted that in lieu of the novel activation technique presented in the invention, the metallic aluminum may be activated before being placed in the reaction system by methods known to those skilled in the art. Moreover, catalytic quantities of the activators have been used with good success in practicing the invention. In short, the use of activated aluminum is preferred.

An important feature of the invention lies in the discovery that by its application an impure aluminum source, such as an aluminum alloy, can be converted to pure aluminum by a comprehensive process which is readily conducted and susceptible to operation on a continuous basis. In accordance with this second embodiment of the invention there is provided a process for recovering aluminum from an aluminum source which is associated with impurities by first synthesizing a tertiary amine alane from reaction among the aluminum source material, hydrogen, and a tertiary mono amine in the presence of at least one catalytic element found in Group IV–B or V–B. The next stage of the aluminum recovery embodiment of the invention is characterized by effecting a separation between the synthesized amine alane and residual solids in the system, and subsequently decomposing the alane to form purified aluminum. The by-products of the decomposition, namely hydrogen and tertiary mono amine, can be recovered and reused in a batch process or recycled in a continuous process to the amine synthesis phase of the invention, the practice of which is outlined above. In addition, the solvent and the alkyl aluminum compound, where utilized, may be recycled in a continuous system.

In the aluminum separation embodiment of the invention decomposition of the amine alane product into aluminum, hydrogen and tertiary mono amine is preferably undertaken while the alane is in solution. This may be accomplished by use of an alane-dissolving inert solvent introduced into the system according to the technique outlined in the amine synthesis embodiment or by addition of such a solvent after preparation of the alane. As heretofore noted, use of a solvent aids in separating solids from the reaction system, although the same result can be accomplished where the reaction products are not in solution by use of any suitable leaching or extraction technique to remove the amine alane.

Decomposition temperatures may range from room temperature upward, and the decomposition may be catalyzed or uncatalyzed. Suitable catalysts are titanium and vanadium esters and halides. If an uncatalyzed decomposition process is used, a high boiling solvent is preferred, and a preferred temperature range in which to carry out the decomposition is from about 80° to about 170° C. An even more preferred decomposition temperature range is from about 120° to about 150° C., and a most preferred temperature at which to effect uncatalyzed decomposition is about 150° C. For maximum effectiveness in carrying out uncatalyzed decomposition of the amine alane under conditions where a solvent is used, the solvent chosen should preferably have a boiling point above the decomposition temperature of the alane, but this feature is not absolutely essential.

In addition to providing an effective medium for separating solids in the reaction system from the amine alane solution, use of a suitable solvent in system lends ease to the separation of precipitated aluminum as the decomposition progresses and further furnishes a basis for separating the tertiary mono amine and hydrogen reaction products from the aluminum in order to reuse these components as feed for the initial amine alane synthesis. The techniques of physically effecting separation of the tertiary mono amine and hydrogen, and recycling these components to the synthesis stage of the process are well known to those skilled in the art, and any suitable method may be used to accomplish this result. It should be noted that if the amine alane product is synthesized without the use of a solvent, then following its separation from residual solids in the product by conventional extraction or leaching techniques, it may be decomposed under dry conditions by heating, and the products of this pyrolysis may be collected. Other techniques for separating components in the dry state may be used in practicing this phase of the invention according to the knowledge of those skilled in the art. All of the alanes formed from amines which were heretofore discussed in the amine synthesis embodiment of the invention (including trialkylamines, heterocyclic amines and more specifically, trimethylamine) may be readily decomposed to yield substantially pure aluminum by application of the second embodiment of the invention. Practice of the invention is characterized by convenient flexibility in that these teriary mono amine alanes may be decomposed with or without the aid of a solvent or catalyst as pointed out above.

Reaction conditions, methods of introducing reactants and operating techniques, as well as the benefits and advantages of the invention will be more readily understood by reference to the following examples which are merely

EXAMPLE I

In preparing trimethylamine alane, 14 grams of carbothermic aluminum alloy (previously sieved to pass a 325 mesh screen) containing approximately 68 percent aluminum, 27 percent silicon, 3 percent iron and 2 percent titanium was charged with 3 milliliters of triethylaluminum, 50 milliliters of benzene solvent and 0.5 gram of sodium metal into a 300 milliliter Magne-Stir autoclave, using a nitrogen box to avoid oxygen contamination. One hundred and eleven milliliters of trimethylamine was measured volumetrically as a liquid at $-80°$ C. and distilled into the autoclave. The autoclave was then pressured to 4000 p.s.i.g. with hydrogen, the contents were heated to $80°$ C. and mixing was accomplished by baffled stirring. After an induction period of several hours the pressure began to drop and when it leveled off, the autoclave was cooled, vented, and opened in the dry box. The contents were filtered and the clear, colorless trimethylamine alane filtrate was decomposed to yield aluminum, hydrogen, and trimethylamine.

Decomposition of the trimethylamine alane was carried out by placing a 40 centimeter air-cooled condenser on a round-bottom flask containing the amine alane solution. A Dean-Stark trap was placed on top of the condenser and a dry ice condenser was used to retain the amine in the trap. Simple heating of the trimethylamine alane solution to a temperature of from $120-150°$ C. gave rapid decomposition, the aluminum metal precipitating as a powder in the heated solution. This powder was filtered, dried and weighed. The yield of aluminum was found to be 3.99 grams, or 47.5 percent based on the aluminum present in the alloy. Subsequent emission spectroscopy analysis showed the aluminum product to be of good purity with trace amounts of magnesium and silicon as the only impurities observed.

EXAMPLE II

The preparation of trimethylamine alane is repeated as in Example I, 0.01 milliliter $TiCl_4$ being added to the benzene-trimethylamine alane solution and this solution is heated to the boiling point of the benzene. Gassing immediately occurs with evolution of hydrogen and trimethylamine and aluminum powder is precipitated. After 20 minutes the reaction is substantially completed. The aluminum powder is filtered, dried and weighed and the yield is about 4 grams or a 47 percent based on the aluminum present in the alloy.

EXAMPLE III

Equipment used in this experiment was the same as that noted in Example I with the exception that no baffle was used in the stirring on this run. Seven grams of aluminum metal (sieved to pass a 325 mesh screen and containing no titanium) was charged into the autoclave with 3 milliliters of triethylaluminum, 50 milliliters of benzene, 0.5 gram of sodium metal and 1 milliliter of titanium isopropoxide. One hundred and eleven milliters of trimethylamine was distilled into the autoclave, which was then pressured to 4000 p.s.i.g. The temperature was adjusted to $80°$ C., and after several hours of reaction time the autoclave was cooled, vented and oepned in the nitrogen box.

Decomposition of the trimethylamine alane was accomplished according to the procedure followed in Example I, and the yield of aluminum was found to be 3.59 grams, or 51.3 percent based on the aluminum metal reacted.

EXAMPLE IV

The procedure, equipment, reactants and reaction conditions of Example III were utilized except that vanadium tetrachloride was substituted for titanium isopropoxide as a reaction promoter. Aluminum yield was found to be 3.24 grams, or 46.3 percent based on the aluminum metal reacted.

EXAMPLE V

The procedure, equipment, reactants and reaction conditions of Example III were again utilized except that triethylaluminum and titanium isopropoxide were not added to the system and the aluminum metal was activated before being reacted. Essentially no aluminum product was formed.

Example V illustrates the fact that in the absence of titanium (or other catalytic element used pursuant to this invention), aluminum—even when in activated form—cannot be caused to react with a tertiary mono amine and hydrogen under practical reaction conditions.

EXAMPLE VI

The procedure of Example I was repeated using 9.5 grams of commercially-available aluminum (containing 1900 parts per million titanium), 55.5 milliliters of trimethylamine, 100 milliliters of benzene. System temperature was maintained at $70°$ C. during the reaction period of nine hours. All other reactant quantities and process conditions were as in Example I, with the exception that the baffle was removed in this run. The residue of aluminum was found to be 3.12 grams which represents a yield of 32.8 percent.

EXAMPLE VII

The procedure of Example I was repeated using 7 grams of the carbothermic aluminum alloy, 1 milliliter of titanium isopropoxide, 110 milliliters of trimethylamine (as both the reactant and solvent) and maintaining the reaction temperature at $110°$ C. All other reactant quantities and process conditions were as in Example I, except that there was no benzene solvent present in the system and the baffle was eliminated in the stirring procedure. 2.84 grams of aluminum was found to be present for a yield of 67.5 percent.

EXAMPLE VIII

The procedure of Example I was repeated using the components therein with the following alterations: 5 milliliters of triethylaluminum, 2 grams of sodium hydride (instead of sodium used in Example I), 100 milliliters of benzene, and 55.5 milliliters of trimethylamine were used. The temperature was maintained at $70°$ C. with stirring (no baffle), and the yield of aluminum was found to be 1.66 grams, or 19.8 percent.

EXAMPLE IX

The procedure of Example I was repeated, using the same reactants in the same quantities, except that 7 grams of the carbothermic aluminum alloy was used and 50 milliliters of tetrahydrofuran was substituted for benzene as the reaction solvent. Product aluminum was found to be present in a 45 percent yield, 1.89 grams having been isolated.

EXAMPLE X

The procedure of Example I was repeated using 100 milliliters of diphenyl ether as a solvent, 3 milliliters of triethylaluminum as the sole activator, and conducting the reaction at $70°$ C. All other reactants were present in the same quantities as set forth in Example I. 1.27 grams of aluminum was extracted for a yield of 13.4 percent.

As indicated in the foregoing examples, a variety of process conditions can be effectively employed in practicing the many features present in both embodiments of the invention. The reaction may take place with or without a solvent and in the presence of a variety of catalysts, which may be introduced into the system by various advantageous methods. Reaction conditions may vary widely without substantially adversely affecting the yield of aluminum product realized and operating procedures are relatively simple.

In view of these and other features disclosed in the process, the invention makes a maximum contribution to the art in the utilization of a novel method of producing aluminum by synthesizing and subsequently decomposing tertiary amine alane complex compounds.

We claim:

1. A process for recovering aluminum from metallic aluminum associated with impurities which comprises:
   (a) forming tertiary amine alane by effecting reaction among said metallic aluminum, hydrogen, and a tertiary mono amine in the presence of a reaction promoting quantity of at least one element of Group IV–B or V–B,
   (b) effecting a separation between the amine alane product and the solids in the system, and
   (c) decomposing the amine alane product to form purified aluminum.

2. The process of claim 1 wherein the reaction of (a) is conducted in a liquid phase in which the amine alane product is soluble.

3. The process of claim 1 wherein the metallic aluminum associated with impurities is an aluminum alloy.

4. The process of claim 1 wherein the process of (c) is effected in the presence of a catalyst.

5. A process for recovering aluminum from an aluminum alloy which comprises:
   (a) forming tertiary amine alane by effecting contact, in an essentially anhydrous system, among subdivided metallic aluminum alloy, a tertiary mono amine, and hydrogen at a pressure within the range of about 50 to about 15,000 p.s.i.g. and for a period of time and at a temperature within the range of about 50° C. to about 200° C. sufficient to result in the uptake of hydrogen and the formation of the tertiary amine alane, said aluminum alloy containing from about 0.001 to about 10 percent by weight of titanium, from about 0.1 to about 10 percent by weight of iron, from about 5 to about 50 percent by weight of silicon and at least about 40 percent by weight of aluminum, said system including a relatively inert solvent in which the tertiary mono amine and the amine alane product are soluble,
   (b) effecting a separation between the solids in the system and the amine alane product, and
   (c) decomposing the amine alane product to form essentially pure aluminum.

6. The process of claim 5 wherein (c) is effected by heating the amine alane product in an inert environment to a temperature sufficiently high to cause it to thermally decompose into essentially pure aluminum, hydrogen and tertiary mono amine.

7. The process of claim 5 wherein (c) is effected by heating the amine alane product in an inert environment to a temperature sufficiently high to cause it to thermally decompose into essentially pure aluminum, hydrogen and tertiary mono amine and wherein hydrogen and tertiary mono amine are recovered in (c) and recycled to (a).

8. The process of Claim 5 wherein (c) is effected by heating the amine alane product while dissolved in said solvent to a temperature sufficiently high to cause the amine alane product to thermally decompose into essentially pure aluminum, hydrogen and tertiary mono amine.

9. The process of claim 5 wherein (c) is effected by heating the amine alane product while dissolved in said solvent to a temperature sufficiently high to cause the amine alane product to thermally decompose into essentially pure aluminum, hydrogen and tertiary mono amine and wherein hydrogen and tertiary mono amine are recovered and reused in (a).

10. The process of claim 5 wherein (c) is effected in the presence of a titanium or vanadium ester or halide.

11. The process of claim 9 wherein said tertiary mono amine is a trialkyl amine.

12. The process of claim 9 wherein said tertiary mono amine is a heterocyclic amine.

13. The process of claim 9 wherein said tertiary mono amine is trimethyl amine.

14. The process of claim 9 wherein said solvent has a boiling point above the temperature at which the amine alane product is thermally decomposed.

15. The process of claim 9 wherein said alloy is a carbothermic aluminum alloy, said amine is trimethyl amine, said solvent is a trialkylamine and said heating of the amine alane product involves a temperature in the order of from about 80° to about 170° C.

References Cited

UNITED STATES PATENTS 3,326,955   6/1967   Brendel et al. _____ 260—448

OTHER REFERENCES

Canadian Journal of Chemistry, vol. 41, No. 5, May 1963, pp. 1051–1058.

L. DEWAYNE RUTLEDGE, Primary Examiner

TERRY RAY FRYE, Assistant Examiner

U.S. Cl. X.R.

75—05, 97, 121; 260—448, 270